Sept. 6, 1927.
T. L. FITZPATRICK
1,641,845
SPEED REDUCING GEAR
Filed May 3, 1927
2 Sheets-Sheet 1
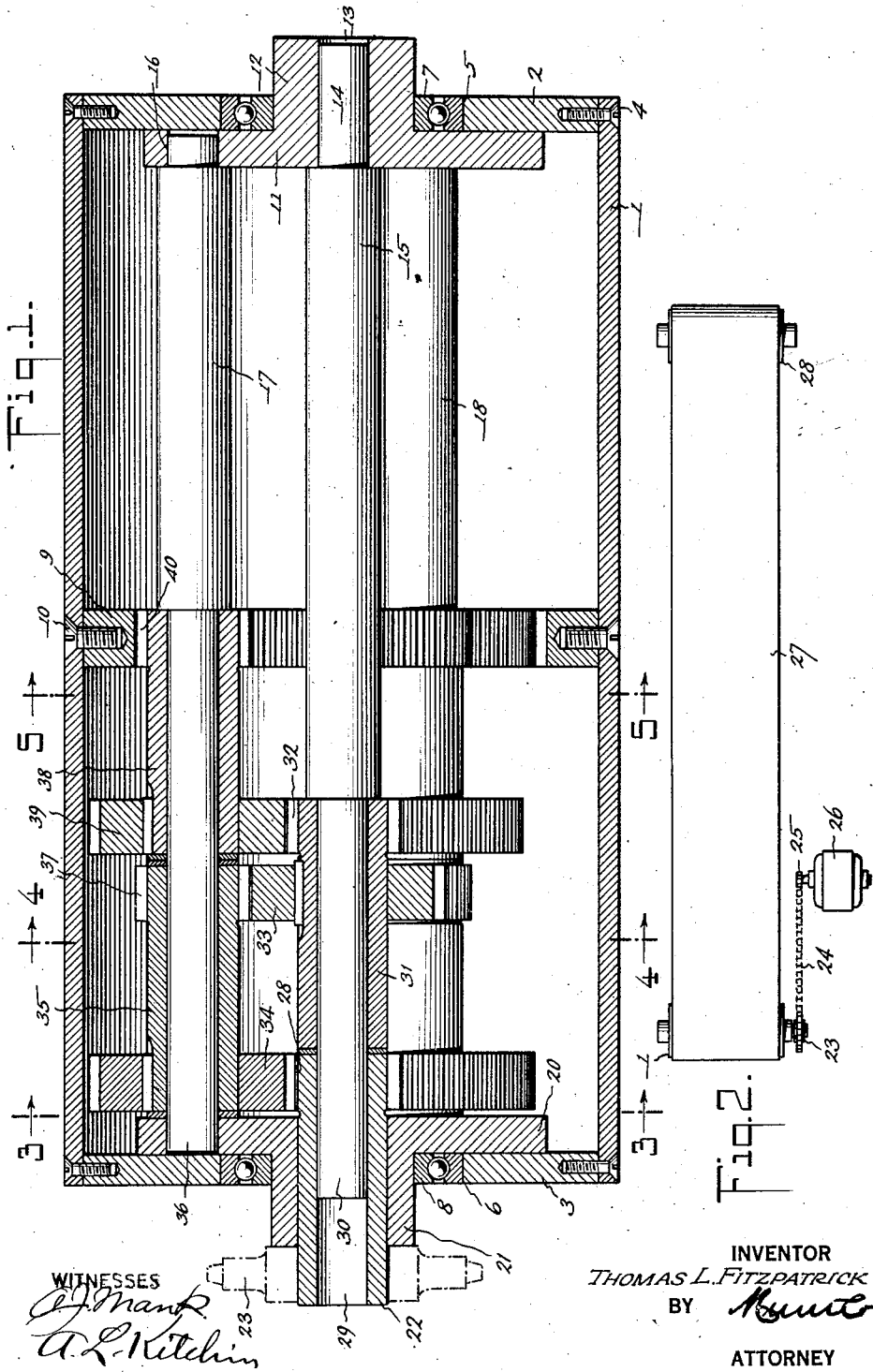
INVENTOR
THOMAS L. FITZPATRICK
BY
ATTORNEY

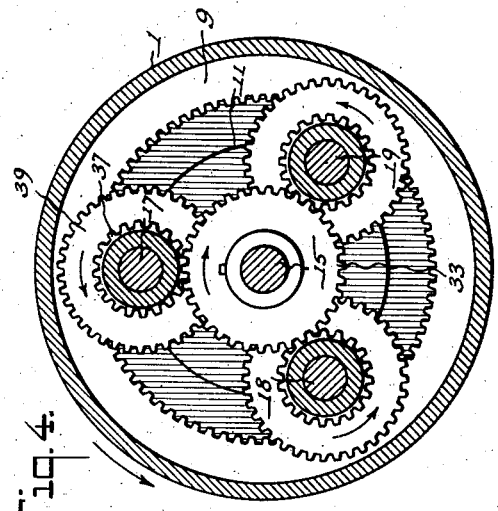
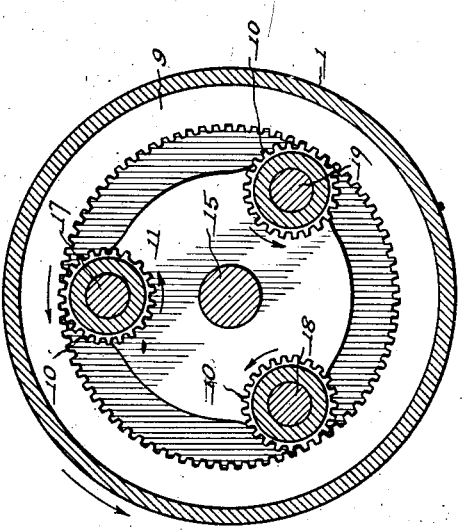
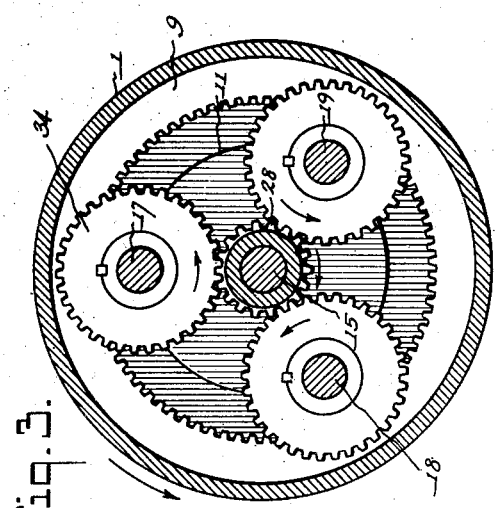

Patented Sept. 6, 1927.

1,641,845

UNITED STATES PATENT OFFICE.

THOMAS L. FITZPATRICK, OF MASSENA, NEW YORK.

SPEED-REDUCING GEAR.

Application filed May 3, 1927. Serial No. 188,448.

This invention relates to a speed reducing or speed changing device, and has for an object to present an improved construction which may be readily adjusted to secure different speeds and transmit substantially any desired power.

Another object of the invention is to provide a speed reducer in which the parts are so arranged that the casing of the device will act as means for receiving or transmitting the power through a belt or other transmitting means.

In the accompanying drawings—

Figure 1 is a longitudinal vertical sectional view through a speed reducer, disclosing an embodiment of the invention.

Figure 2 is a top plan view of a belt and associated parts, including a speed reducer and power connections therefor.

Figure 3 is a transverse sectional view through Figure 1, approximately on line 3—3.

Figure 4 is a transverse sectional view through Figure 1 on line 4—4.

Figure 5 is a sectional view through Figure 1, on line 5—5.

Referring to the accompanying drawings by numerals, 1 indicates a drum or casing to which end members 2 and 3 are secured in any desired manner, as for instance, by suitable screws 4. These end members are provided with openings 5 and 6 which carry bearing members 7 and 8, said bearing members preferably being of a well known ball bearing type fitted properly into the openings 5 and 6 so as not to be accidentally removed. Arranged preferably substantially centrally of the drum or casing 1, is a ring 9 which is provided with internal gear teeth so that the member or ring 9 is in fact, an internal gear secured rigidly to the casing 1 by suitable means, as for instance, screws 10. Arranged adjacent the end member 2 is a member 11 which may be termed a spider, though preferably it is formed as a disk with a hub 12 extending through the bearing 7 by which it is supported. The hub 12 is provided with a bore 13 for receiving the reduced section 14 of the shaft 15. The spider or disk 11 is provided with a plurality of apertures 16, there being three to accommodate the three shafts 17, 18 and 19. At the opposite end, namely, at end 3, a spider 20 is provided, which is identical in all respects with spider 11 except that the hub 21 has a larger bore for receiving the tubular shaft 22. The ends of the shafts 17, 18 and 19, are journaled in the spider 20 in a similar manner to the way they are journaled in spider 11. Three shafts have been shown as clearly illustrated in Figure 5, but if desired, a greater or even a less number could be used without departing from the spirit of the invention. The tubular shaft 22 is adapted to receive power or transmit power as the case may be, and may be provided with any suitable receiving or transmitting member, as for instance, the sprocket wheel 23. This sprocket wheel, as shown in Figure 2, accommodates a sprocket chain 24, which passes over a sprocket wheel 25 carried by an electric motor 26. A belt 27 is fitted onto the casing 1 and also onto the drum 28, whereby whenever motor 26 is operated, the belt 27 is caused to function. The tubular shaft 22 extends a short distance beyond the spider 20 and has a pinion 28 formed integral therewith or rigidly secured thereto as preferred. The bore 29 of shaft 22 accommodates the reduced end 30 of the shaft 15. Mounted on the reduced end 30 is also a sleeve 31 which has rigidly secured thereto or formed integral therewith, a pinion 32 preferably of the same size as pinion 28. A gear wheel 33 is keyed or otherwise rigidly secured to the sleeve 30 adjacent the pinion 32. Pinion 28 meshes with a gear wheel 34 keyed or otherwise rigidly secured to the sleeve 35, which sleeve is rotatably mounted on the reduced extension 36 of shaft 17. A pinion 37 is formed integral with or rigidly secured to sleeve 35, said pinion 37 continually meshing with the gear wheel 33. A second sleeve, namely, sleeve 38, is rotatably mounted on the reduced extension 36, said second sleeve having a gear wheel 39 rigidly secured thereto by a key or otherwise, said gear wheel 39 continually meshing with pinion 32. Sleeve 38 has formed integral therewith or rigidly secured thereto, a pinion 40 continually meshing with the teeth of the internal gear 9. The shafts 18 and 19 are provided with sleeves identical with sleeves 35 and 38 and also provided with gear members identical with the gear members 34, 37, 39 and 40 and will, therefore, need no additional description. In this way, power is transmitted from the pinion 28 at three points to the respective sleeves 35 and these sleeves at three points transmit the power to sleeve 31. Sleeve 31 at three points, transmits the power to the sleeves 38 through the various gears 39. The various sleeves 38 transmit the power at three points through the pinions 40 to the internal gear 9. The hubs 12 and 21 may be supported by any stationary objects which will hold these hubs stationary while power transmitted through shaft 22 will cause the drum or casing 1 to rotate.

As shown in the accompanying drawings, the gears are so proportioned as to give a certain ratio of movement between the hollow shaft 22 and the drum or casing 1. If it should be desired to change the ratio, the various pinions and gears must be also changed and when re-arranged, the mechanism will operate as just set forth. It will also be evident that if desired, power could be applied through a belt or otherwise to the drum or casing 1 and taken off through the shaft 22.

What I claim is:

1. A speed reducer of the character described comprising a casing circular in cross section, the periphery of which acts as a pulley, means rigidly secured to the casing acting as end members a hollow driving shaft extending through one of said end members, a series of toothed members for connecting the hollow driving shaft with the casing so that the casing will rotate at a different speed from the hollow driving shaft, and means for rotatably supporting the toothed members in the casing said means including a central shaft journaled at one end in one of said end members and at the other end in said hollow shaft, a countershaft arranged parallel to said central shaft, and disks rotatably supported on said end members acting to support said countershaft at its respective ends.

2. A speed reducer of the character described comprising a casing, a gear ring secured to the casing interiorly, means rigidly secured to the casing acting as end members a hollow driving shaft, a series of toothed members connecting the driving shaft with the gear ring whereby as the driving shaft is rotated the gear ring will be rotated and consequently the casing, said toothed members including three sets of gear members, acting as speed reducing structures with one set acting as means for transmitting power to the gear ring and means for rotatably supporting said three sets of gear members, said means including a central shaft journaled at one end in one of said end members and at the other end in said hollow shaft, three countershafts arranged parallel to said central shaft, and a disk rotatably mounted on each of said end members, said disks being positioned to receive the ends of said countershafts for supporting said countershafts and allowing the countershafts to move in a circle.

3. A speed reducer of the character described comprising a hollow casing, end members rigidly secured to the ends of said casing, a disk arranged interiorly of the casing near each of said end members, each of said disks having a hollow hub extending through its adjacent end member, a hollow drive shaft extending through one of said hubs into the interior of the casing, a central shaft having one end journaled in said hollow shaft and the opposite end in the hub of the disk at the opposite end of the casing, a series of auxiliary shafts spaced from the central shaft positioned with their ends journaled in said disks, an internally toothed ring rigidly secured to the interior of the casing, a pinion rotatably mounted on each of the auxiliary shafts meshing with said gear ring, and a series of gear wheels connected with each of said pinions, some of said geared members being rotatably mounted on the auxiliary shafts and others on said central shaft, and a master toothed member rigidly secured to said hollow shaft meshing with one geared member on each of said auxiliary shafts.

THOMAS L. FITZPATRICK.